(12) United States Patent
Lindsay

(10) Patent No.: US 7,395,782 B1
(45) Date of Patent: Jul. 8, 2008

(54) SYSTEM AND METHOD FOR PROVIDING SELECTIVE ACCESS TO ANIMAL FOOD

(75) Inventor: Todd A. Lindsay, Camarillo, CA (US)

(73) Assignee: L.P. Holdings LLC, Camarillo, CA (US)

( * ) Notice: Subject to any disclaimer, the term of this patent is extended or adjusted under 35 U.S.C. 154(b) by 322 days.

(21) Appl. No.: 11/087,199

(22) Filed: Mar. 22, 2005

Related U.S. Application Data

(60) Provisional application No. 60/555,639, filed on Mar. 24, 2004.

(51) Int. Cl.
*A01K 1/10* (2006.01)
(52) U.S. Cl. .................. 119/51.02; 119/52.3; 119/57.9; 119/62; 49/30
(58) Field of Classification Search ............. 119/51.02, 119/52.3, 57.9, 62, 63; 340/430; 49/30
See application file for complete search history.

(56) References Cited

U.S. PATENT DOCUMENTS

| | | | | |
|---|---|---|---|---|
| 3,143,239 A * | 8/1964 | Wiley et al. | .................. | 220/796 |
| 3,645,182 A * | 2/1972 | Kimura | ....................... | 396/413 |
| 3,785,348 A * | 1/1974 | Polidori et al. | ................ | 119/62 |
| 3,910,629 A * | 10/1975 | Woodard | ..................... | 296/101 |
| 4,242,985 A * | 1/1981 | Freeborn | ....................... | 119/54 |
| 4,671,210 A * | 6/1987 | Robinson et al. | .......... | 119/51.12 |
| 4,771,906 A * | 9/1988 | Hennig et al. | ................... | 220/8 |
| 4,773,457 A * | 9/1988 | Bierbrauer et al. | ............ | 74/608 |
| 5,368,192 A * | 11/1994 | Ransom, II | .................. | 221/277 |
| 5,758,597 A * | 6/1998 | Palmers | .................... | 119/57.92 |
| 6,349,671 B1 * | 2/2002 | Lewis et al. | ............... | 119/51.02 |
| 6,446,574 B2 * | 9/2002 | Bickley | ........................ | 119/55 |
| 2002/0134313 A1 * | 9/2002 | King et al. | ............... | 119/51.02 |
| 2002/0181095 A1 * | 12/2002 | Ruehl et al. | .................. | 359/385 |
| 2003/0070622 A1 * | 4/2003 | Vaags | ...................... | 119/51.11 |

* cited by examiner

*Primary Examiner*—Michael R. Mansen
*Assistant Examiner*—Valentina Xavier
(74) *Attorney, Agent, or Firm*—Richard S. Erbe

(57) ABSTRACT

A system and method for providing access to animal food utilizes identification tags on domestic animals, generally attached to a collar. The identification tag generates a signal that is detected by a receiver mounted on an enclosed food container. When the receiver detects a pre-selected acceptable signal from an animal, it activates a motor that causes a movable portion of the container to move to an open position. If the signal is no longer detected by the receiver, it activates the motor to move the movable portion of the container to a closed position. If the receiver detects a signal from an identification tag that is not one of the pre-selected signals, it activates the motor to move the movable portion of the container to a closed position.

2 Claims, 9 Drawing Sheets

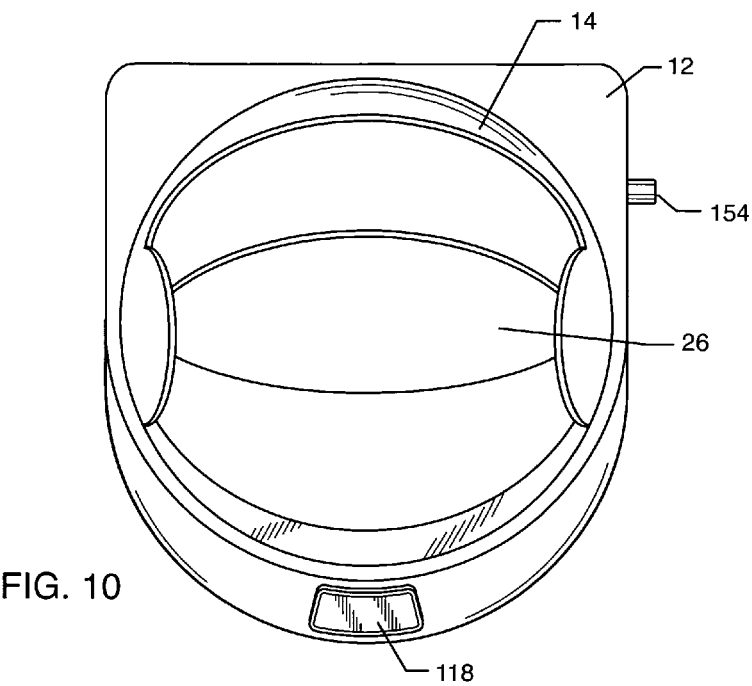
FIG. 10
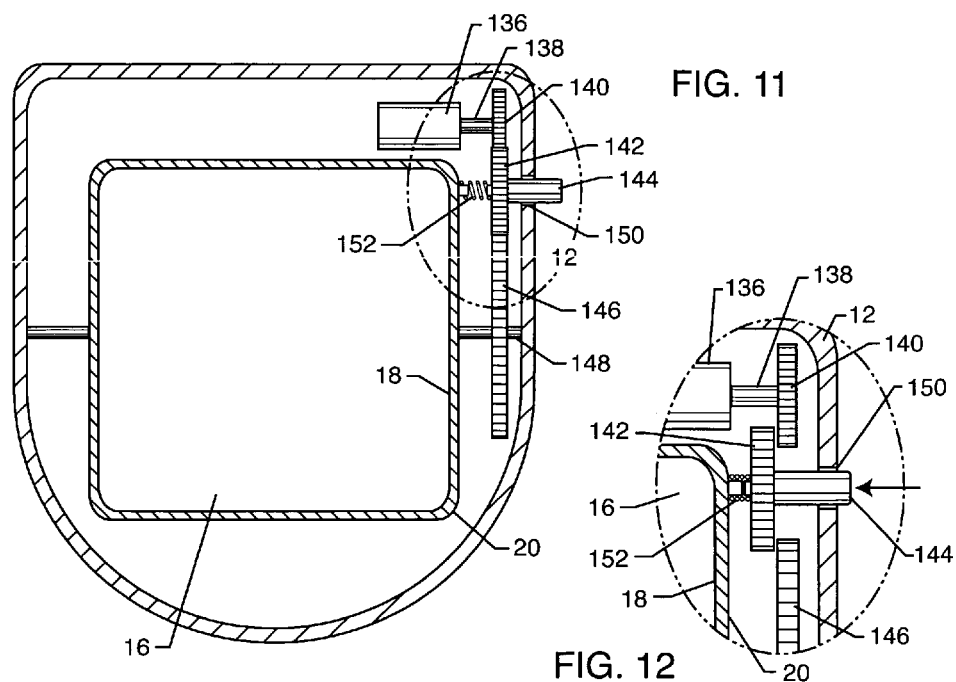
FIG. 11
FIG. 12

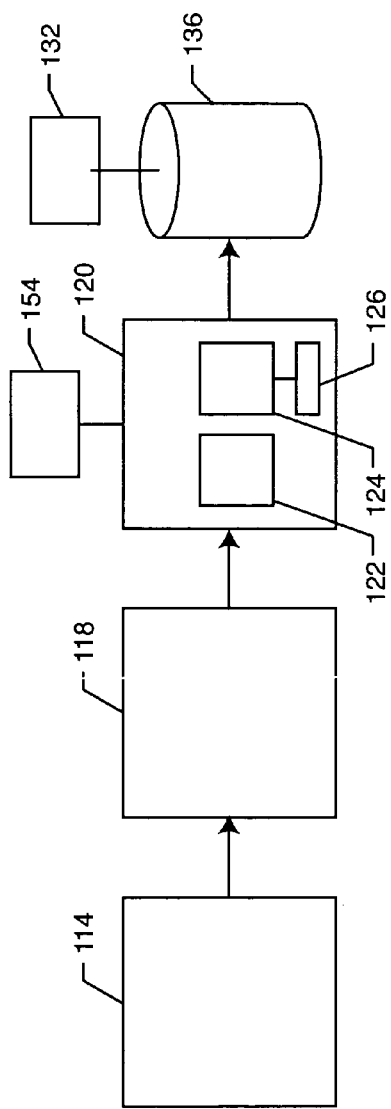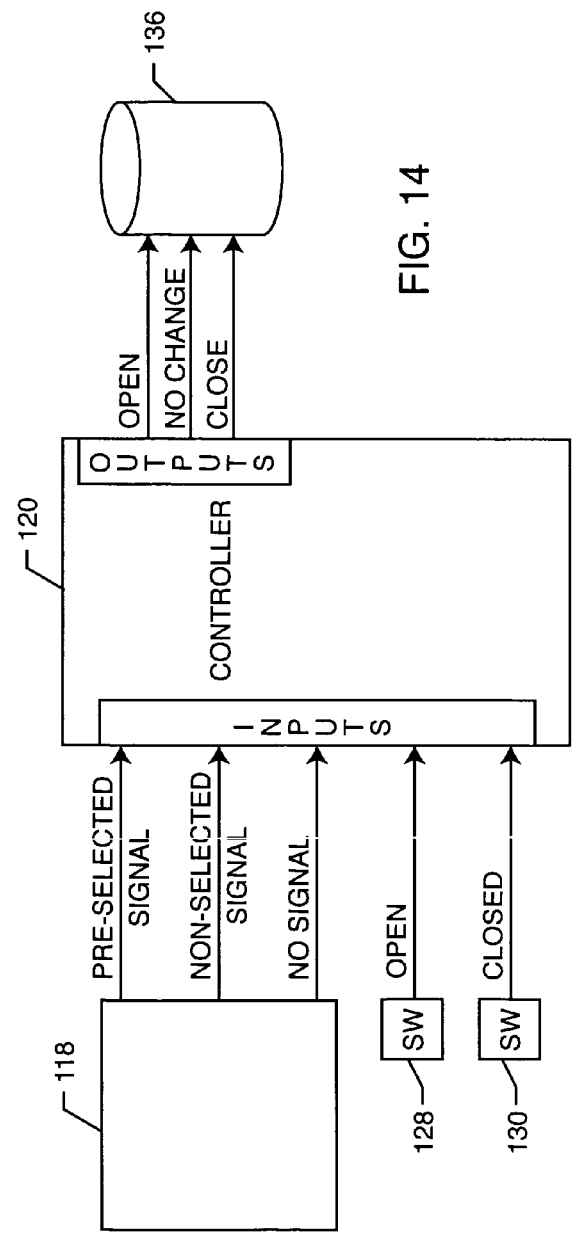

SYSTEM AND METHOD FOR PROVIDING SELECTIVE ACCESS TO ANIMAL FOOD

RELATED APPLICATIONS

This application claims the benefit of U.S. Provisional Patent Application No. 60/555,639, filed Mar. 24, 2004, incorporated herein by reference.

BACKGROUND OF THE INVENTION

1. Field of the Invention

The present invention relates to feeding devices, systems and methods for domestic animals, particularly dogs and cats, and more particularly to a device, system and method for providing selective access to a container holding animal food or water in a multiple pet household. The system of the present invention is able to distinguish between the animals in the household and provides access to food, water and medication to only those animals that the owner chooses, without the owner having to monitor the container holding the food, water, or medication.

2. General Background and State of the Art

It is estimated that in the United States of America, more than 140,000,000 dogs and cats occupy households as pets. Many households have multiple animals. Typically, in any household having multiple domestic animals as pets, there is a "pecking order," where one or more of the animals is dominant, either because of their nature or size, while other animals in the same household may be more docile or smaller in size.

Adequately feeding and watering the more docile animals in a multiple pet household can become a problem, as the docile animals must wait their turn at the food or water bowl until the dominant animal or animals have had their fill, or the dominant animals will "bully" or push the more docile animals away from the food and water as the more docile animals are trying to eat or drink. It can be difficult and annoying for household members to monitor the situation to be sure that all of the animals are receiving adequate food and water.

There can also exist the situation where one or more animals in a household have special needs that not all of the animals in the household have, such as needing certain medication or specific nutritional foods, such as for puppies, kittens, or older animals.

It is also desirable in many households to leave the animal food or water outdoors where domestic animals may spend much of their time. Leaving food or water outside for the domestic household animals may result in attracting unwanted animals, such as birds, raccoons, possums, or squirrels, who wind up eating the food or drinking the water intended for the domestic animals.

Another problem associated with leaving animal food out for feeding is that the food may become dry, or it may attract insects, whether the food is located inside or outside.

No known device, system or method of feeding domestic animals overcomes the problems associated with trying to adequately meet the nutritional needs of a number of domestic animals having varying physical attributes and nutritional needs, while also keeping away unwanted animals and wasting food.

SUMMARY OF THE INVENTION

The device, system and methods of the present invention overcome these problems and provide other benefits as well. The solutions to these problems are achieved by the present invention, which, in a broad aspect, provides the pet owner with an enclosed food/water container that allows access, on a selective basis, to its contents in response to criteria determined by the owner of the animals. Each animal is provided with a means of providing an identification signal specific to that animal that in turn is recognized by a control system integral to the container.

Each animal is equipped with a transmitting device, generally worn on the animal's collar, that transmits a pre-selected signal that specifically identifies that animal. While various technologies are possible for such transmitters, it has been found that one type of transmitter that works well with the present invention is one utilizing RFID technology.

An enclosed container holding animal food and/or water includes a receiver that can detect the signal transmitted by the transmitting device worn by the animals. The receiver and its associated control components are programmed to make a specific response to the presence or absence of the signals transmitted by the transmitting devices worn by the animals.

When the receiver on the container detects an acceptable pre-selected signal, indicating the presence of an animal to which the owner would like to provide access to food or water in the container, the receiver sends a data signal to a controller that activates a motor mounted within the enclosed container. In the case where the signal is an acceptable signal, the motor causes a movable portion of the container to slide open through a system of gears that operates through a drive gear located on the shaft of the motor. When the movable portion of the container opens, the animal is provided access to the food and/or water contained within the container.

As long as the animal whose transmitter is transmitting the acceptable pre-selected signal remains within range of the receiver, the movable portion of the container will remain open so that the animal may eat or drink as much as they want.

Two conditions will cause the movable portion of the container to close. If the animal whose transmitting device provided the acceptable pre-selected signal that caused the container to be open should move out of range of the receiver and no acceptable pre-selected signal is being received, the receiver signals the controller, which activates the motor to move the movable portion of the container to a closed position. In one aspect of the invention, a pre-set time delay of up to three seconds can be programmed into the controller before the movable portion of the container begins to close.

There is a second condition that will cause the movable portion of the container to close, thus preventing access to food and/or water in the container. The owner of the domestic animals in a household may wish to deny access to the container to the more dominant animals or to animals who do not have a need to access the food in the container for nutritional or medical reasons. The owner can do so by providing these animals with the same type of transmitting devices, again generally worn on a collar, that transmit pre-selected unacceptable signals. When these pre-selected unacceptable signals are detected by the receiver on the container, the control system in the container will either not cause the container to open if it is already closed, or it will, after a pre-programmed time delay, activate the motor to cause the movable portion of the container to close and deny access to the other animal. This circumstance may occur even if the receiver is still detecting at least one pre-selected acceptable signal from an animal who might be eating or drinking from the container. This prevents the dominant animals in a household from "bullying" the smaller animals as they are trying to eat or drink from the container.

In another aspect of the invention, an owner can place two or more of the containers having different types of food, or perhaps medication, in different containers and enable his or her animals to access only one specific container, thus enabling all the animals to be adequately fed or medicated without the owner having to spend a great deal of time overseeing the feeding of the animals.

The system and methods of the present invention may also be used outdoors to allow for feeding of animals who spend a great deal of time outdoors while not attracting undesirable animals, such as raccoons, birds, skunks, squirrels and the like to eat from the container.

In another aspect of the invention, food may be kept fresh and free from insects by providing a tight enclosure for food while the container is closed and not being used by the household animals for feeding or drinking.

Further objects and advantages of this invention will become more apparent from the following description of the preferred embodiment, which, taken in conjunction with the accompanying drawings, will illustrate, by way of example, the principles of the invention.

BRIEF DESCRIPTION OF THE DRAWINGS

The foregoing and other aspects and advantages will be better understood from the following detailed description of the preferred embodiments of the invention with reference to the drawings in which:

FIG. 10 illustrates a plan view of a food container for use in an exemplary system in accordance with the present invention;

FIG. 11 illustrates a sectional view taken at line 11-11 of FIG. 4;

FIG. 12 illustrates a sectional view taken at circle 12 in FIG. 11;

FIG. 13 illustrates a block diagram of the control system components for use in an exemplary system in accordance with the present invention; and FIG. 14 illustrates a logic diagram of the control system for use in an exemplary system in accordance with the present invention.

DETAILED DESCRIPTION OF THE PREFERRED EMBODIMENT OF THE INVENTION

In the following description of the invention, reference is made to the accompanying drawings, which form a part thereof, and in which are shown, by way of illustration, an exemplary embodiment illustrating the principles of the present invention and how it may be practiced. It is to be understood that other embodiments may be utilized to practice the present invention and structural and functional changes may be made thereto without departing from the scope of the present invention.

Figure 1:
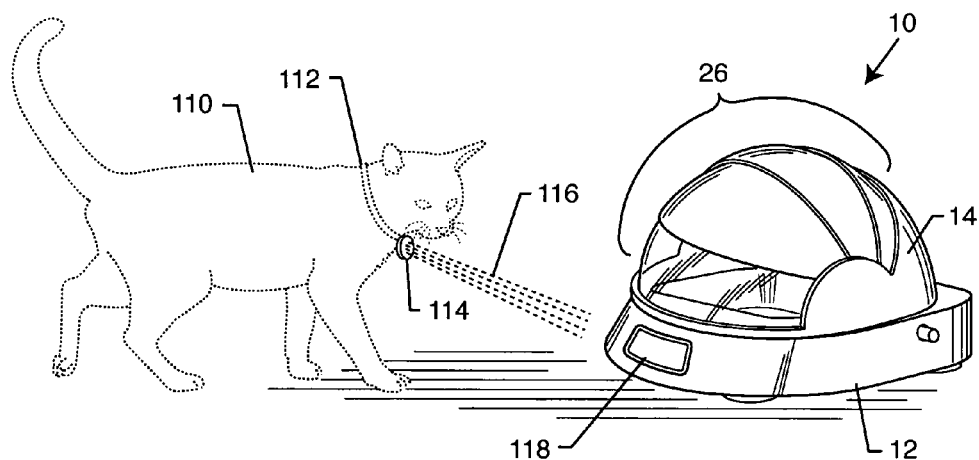
FIG. 1 illustrates a perspective view of an exemplary system in accordance with the present invention with a food container in a closed position as an animal approaches.
Figure 2:
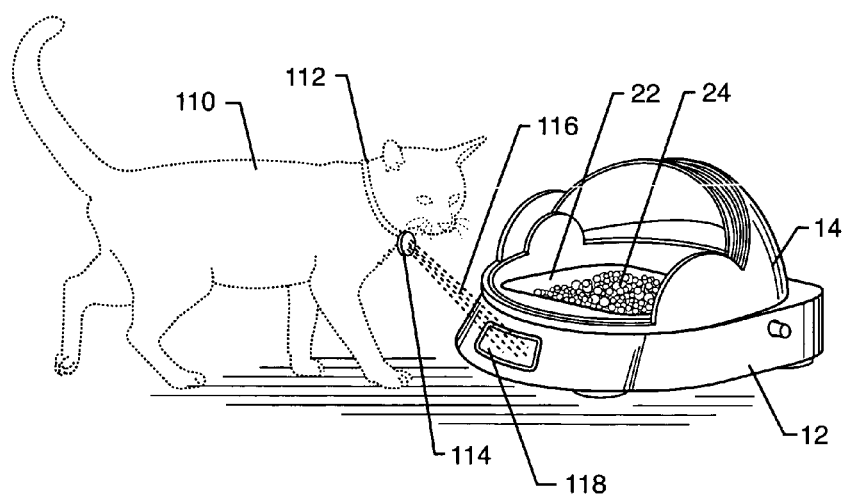
FIG. 2 illustrates a perspective view of an exemplary system in accordance with the present invention with a food container in an open position in response to the approaching animal.

A system in accordance with the present invention is illustrated in FIGS. 1 and 2. A food container, designated by the numeral 10, holds food or water for a domestic animal 110, in this case a cat. However, the system of the present invention may be used to selectively feed a variety of household and domestic animals, including dogs, rabbits, horses and the like.

Container 10 includes base 12 on which is mounted housing 14. Container 10 includes a receptacle 16, which is best shown in FIG. 12, in which is contained bowl 22 holding food 24 for the animal 110. Housing 14 in combination with base 12 forms an enclosed structure that includes a movable portion 26, which is designed to open and close is response to certain pre-selected signals received by receiver 118 mounted in base 12 of container 10.

Animal 110 wears a collar 112, to which is attached a transmitter 114 that transmits a unique identification signal 116 that may be detected by receiver 118 when animal 110 approaches container 10. Transmitter 114 may transmit a variety of signals, although it has been found that an RFID signal works well in a system according to the preferred embodiment of the present invention. The inventor has found that a Medio S001 and/or S002 manufactured by Tagsys Corp. of Doylestown, Pa. is suitable for use as receiver 118, and that an ARIO SM, also manufactured by Tagsys Corp. is suitable for use as transmitter 114.

Signal 116 is pre-selected by the owner of animal 110 to allow or deny access to food 24, water or medication contained in container 10. In a multiple pet household, the owner may choose to have several of the animals to wear transmitters transmitting acceptable signals. If receiver 118 receives an acceptable pre-selected signal, it will activate a control system, the details of which will be explained later, that will cause movable portion 26 of container 10 to move to an open position, allowing access to the contents of bowl 22 to one or more animals 110. When receiver 118 no longer detects an acceptable signal, as when all of the animals have moved away, the control system will cause movable portion 26 to return to a closed position.

In another aspect of the system according to the preferred embodiment of the invention, in a multiple-animal household, some of the animals may be equipped with a transmitter 114 that emits a signal 116 that is not one that is acceptable. In this situation, the control system will not cause movable portion 26 to open, or, if movable portion 26 is in the open position, detection of an unacceptable signal will cause movable portion 26 to close container 10, hence denying access to the contents of container 10 to the animal whose transmitter 114 is emitting an unacceptable signal. This event will occur even if receiver 118 is still detecting at least one acceptable signal. This aspect of the preferred embodiment of the invention is quite useful in situations where a dominant animal in a household might "bully" a smaller, less assertive animal and deny food or water to that animal. If an animal in the household has special dietary needs or requires certain medication in their food, the system in accordance with the preferred embodiment of the invention may be used to ensure that only the animal needing the medication has access to the specialty food or medication without the owner having to strictly supervise access to the food or medication.

Figure 3:
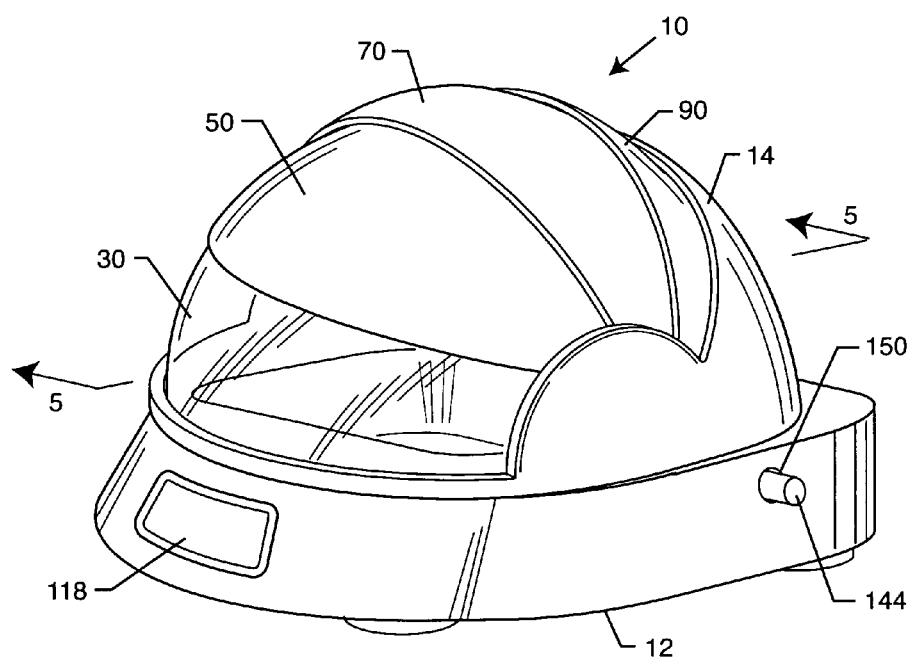
FIG. 3 illustrates a perspective view of a container for use in an exemplary system in accordance with the present invention.
Figure 4:
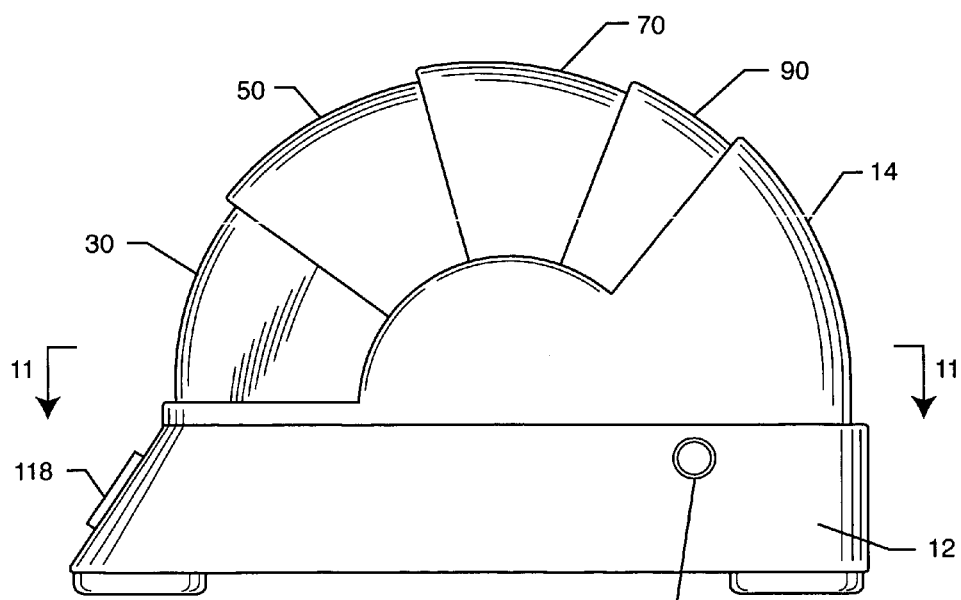
FIG. 4 illustrates a side view of a container for use in an exemplary system in accordance with the present invention.

FIGS. 3 and 4 illustrate container 10 and particularly movable portion 26. In the preferred embodiment of the invention, movable portion 26 is comprised of a number of sections, indicated by numerals 30, 50, 70 and 90, although other structures and more or less than four sections may be used to construct movable portion 26 without departing from the scope of the invention.

Figure 5:
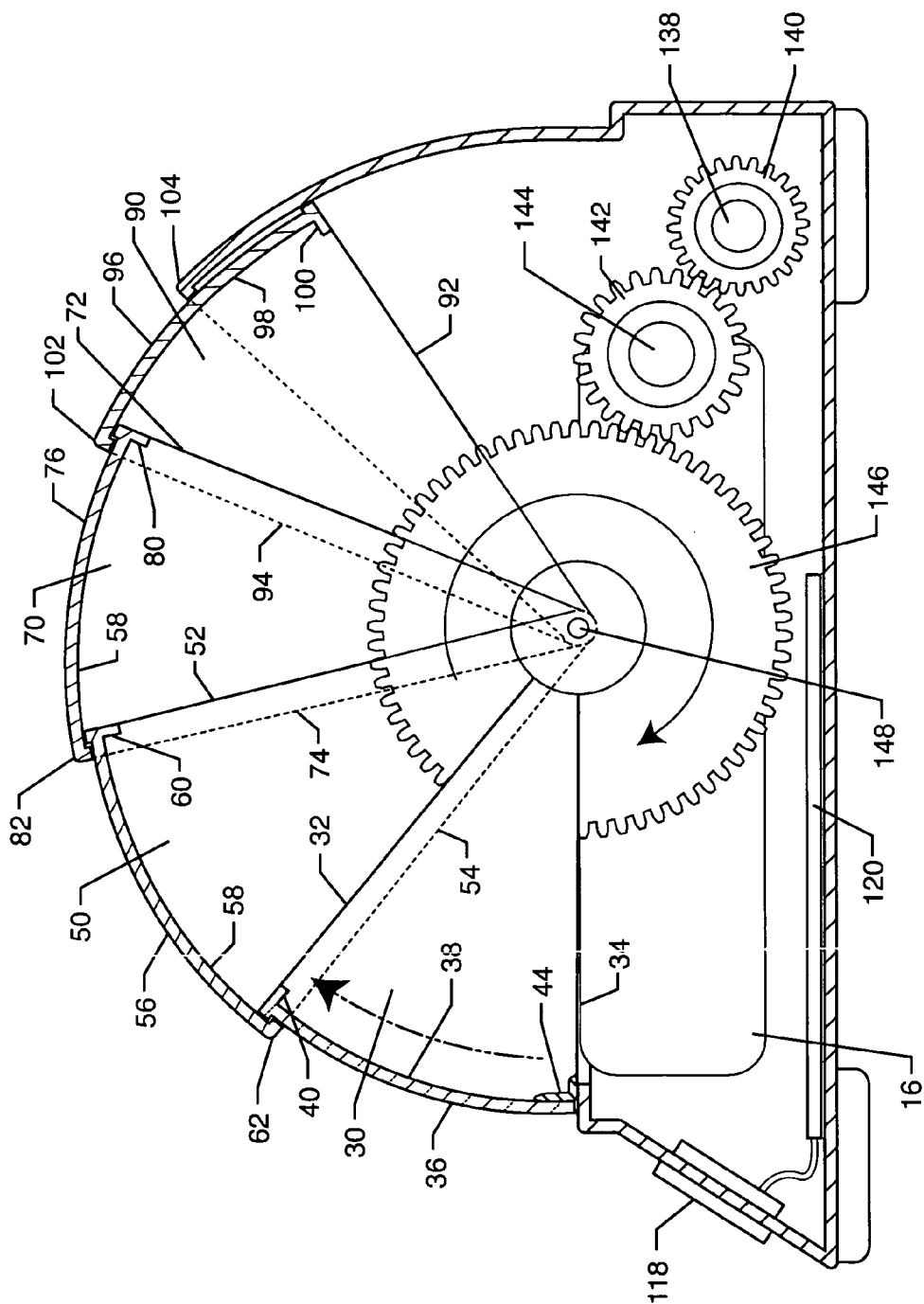
FIG. 5 illustrates a sectional side view taken along line 5-5 of FIG. 3.

FIG. 5 illustrates a sectional view of container 10 showing the construction of sections 30, 50, 70, and 90 of movable portion 26, which, in the preferred embodiment of the invention, are designed in a telescoping construction. First movable portion 30 may also be constructed of a clear material, so that the owner of the animals can observe the status of the contents in receptacle 16 of container 10 while movable portion 26 is in the closed position. First section 30 is constructed of upper edge 32, lower edge 34, outer surface 36, inner surface 38, upper lip 40 mounted on upper edge 32 and a sealing strip 44 mounted on lower edge 34 to provide a seal when container 10 is closed. Sealing strip 44 is preferably a rubber gasket extending along the length of lower edge 34. Upper lip 40 may be a variety of structures such as a tab or a raised surface extending along the length of upper edge 32. The function of upper lip 40 will be explained below.

Second section 50 of movable portion 26 is constructed of upper edge 52, lower edge 54, outer surface 56, inner surface 58, upper lip 60 on upper edge 52, and lower lip 62 on lower edge 54. Third section 70 of movable portion 26 is constructed of upper edge 72, lower edge 74, outer surface 76, inner surface 78, upper lip 80 on upper edge 72, and lower lip 82 on lower edge 74. Fourth section 90 of movable portion 26 is constructed of upper edge 92, lower edge 94, outer surface 96, inner surface 98, upper lip 100 on upper edge 92 and lower lip 102 on lower edge 94. In the preferred embodiment of the invention, upper lips 40, 60, 80 and 100 and lower lips 62, 82 and 102 extend along the length of the surface to which they are mounted, although those skilled in the art will recognize that other constructions are available without departing from the scope of the invention.

FIG. 5 also shows the gearing mechanism which is used to move movable portion 26 between the open and closed positions. Drive gear 140 is mounted on drive shaft 138 of reversible motor 136 (illustrated in FIG. 11). Drive gear 140 engages reduction gear 142, which is mounted on shaft 144. Secondary drive gear 146 is mounted on shaft 148 and engages reduction gear 142. Secondary drive gear 146 is attached to first section 30 of movable portion 26 and moves movable portion 26 in response to signals received from receiver 118, as will be explained later. Controller 120 is also illustrated in FIG. 5, and its function will be explained later.

Figure 6:
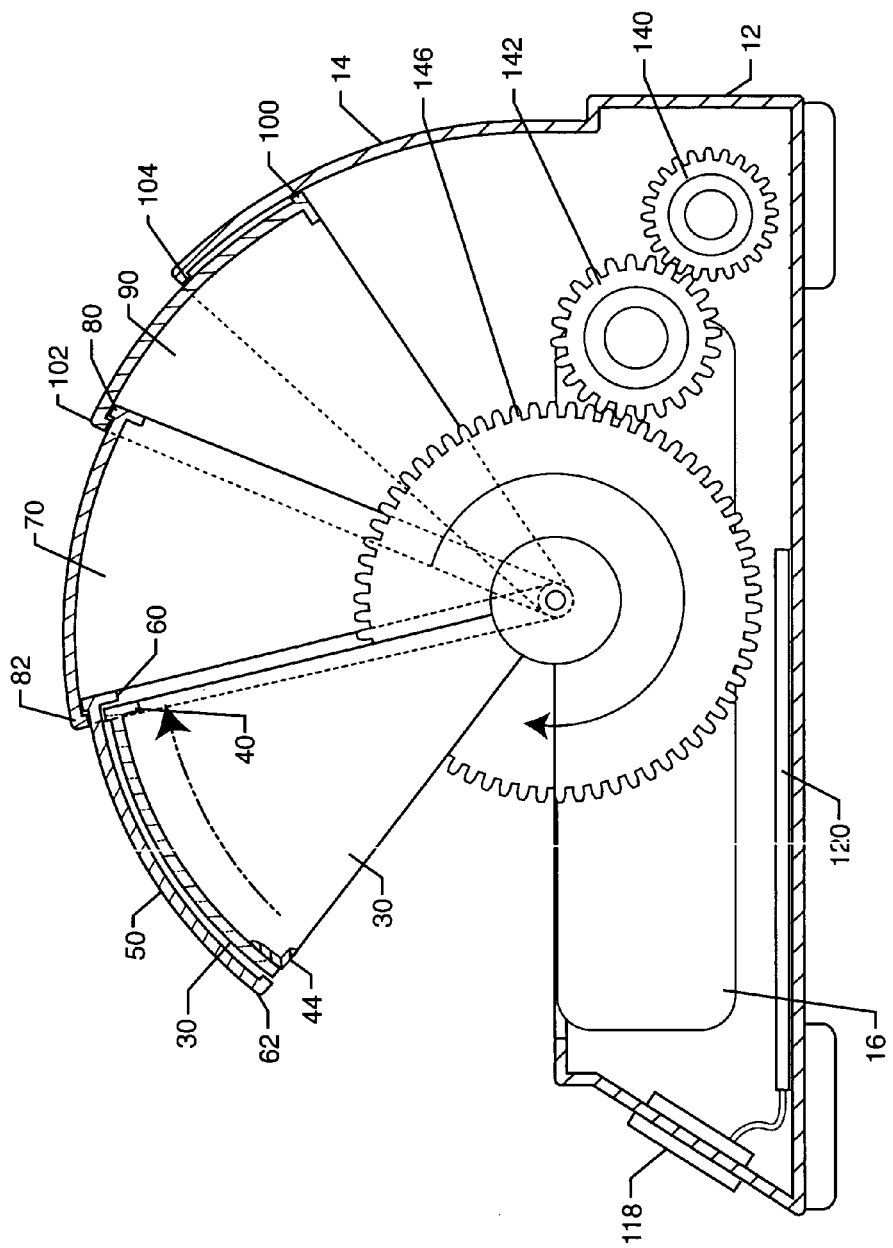
FIGS. 6 through 9 inclusive illustrate sectional side views of a container for use in an exemplary system in accordance with the present invention as the movable portion of the container gradually opens.

FIGS. 6-9 show movable portion 26 and its telescoping sections as they move between the open and closed positions. In FIG. 6, upper lip 40 of first section 30 has engaged upper lip 60 of second section 50 as secondary drive gear 146 has caused the first section 30 to move towards the open position. The engagement of lips 40 and 60 enables first section 30 to cause second section 50 to move towards the open position.

Figure 7:
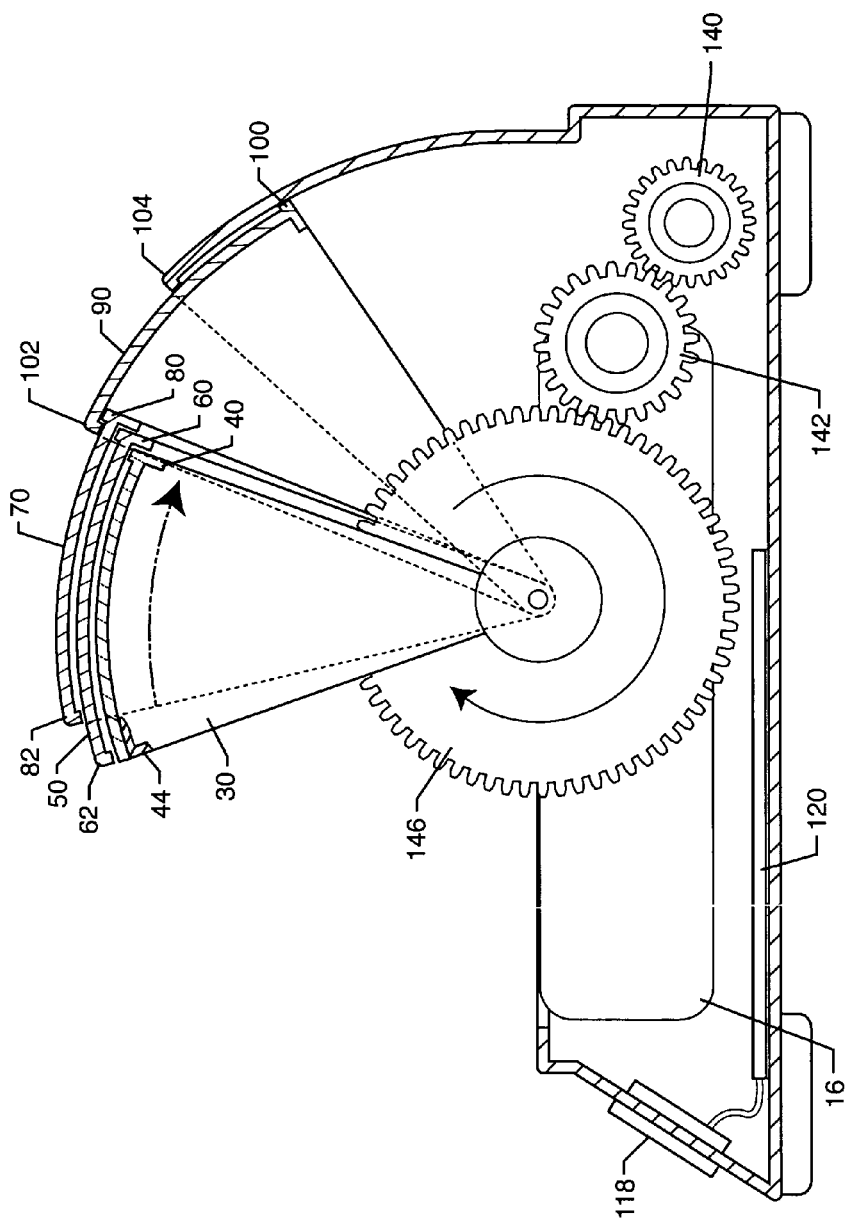
Figure 8:
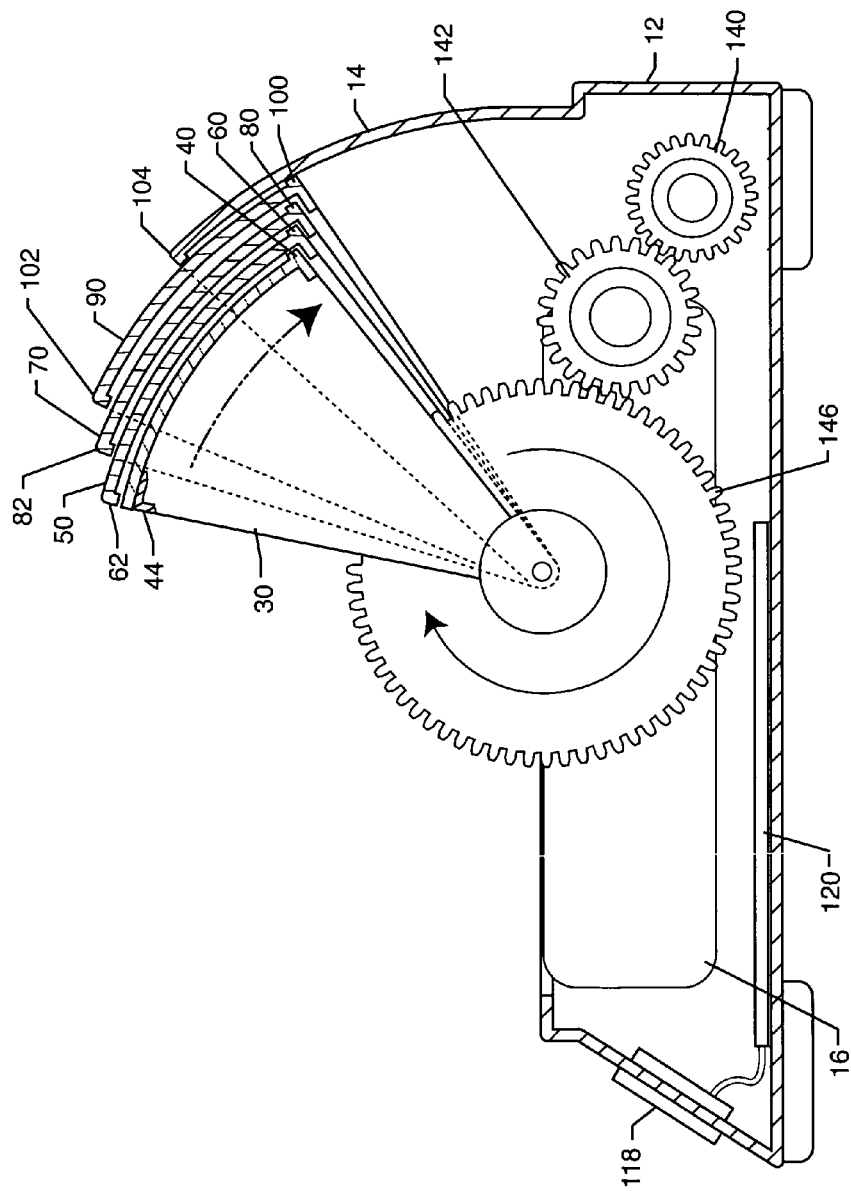

In FIG. 7, upper lip 60 of second section 50 has engaged upper lip 80 of third section 70 to cause third section 70 to move towards the open position. Upper lips 40 and 60 are still engaged at this point. In FIG. 8, upper lip 80 of third section 70 has engaged upper lip 100 of fourth section 90 to cause fourth section 90 to move towards the open position. Upper lips 40, 60 and 80 are still engaged at this point.

Figure 9:
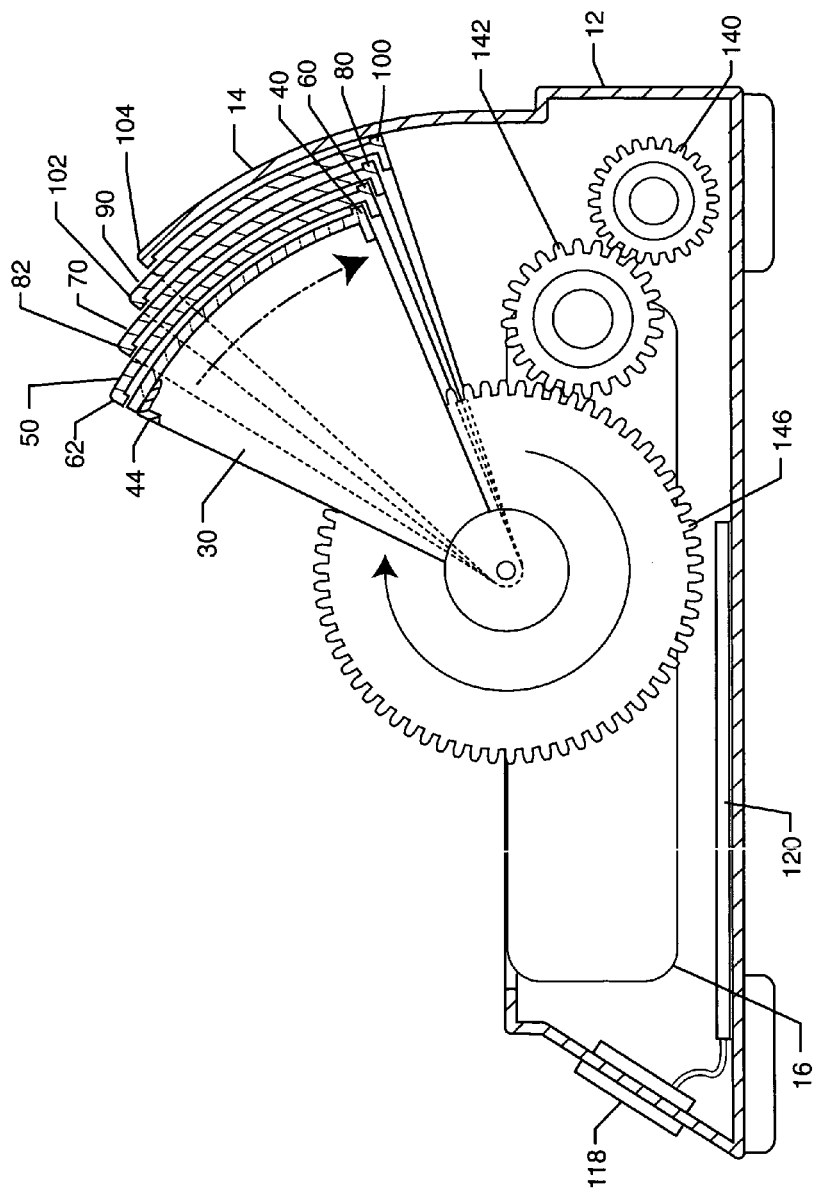

In FIG. 9, movable portion 26 and sections 30, 50, 70 and 90 have moved to the open position, with upper lips 40, 60, 80 and 100 engaged.

During closing operations, secondary drive gear 146 drives first section 30 towards the closed position. As first section 30 moves toward the closed position, upper lip 40 of first section 30 will engage lower lip 62 of second section 50 and cause it to move towards the closed position as first section 30 continues to move towards the closed position. As first section 30 and second section 50 continue to move towards the closed position, upper lip 60 of second section 50 will engage lower lip 82 of third section 70 and cause third section 70 to move towards the closed position. As the movement of first section 30, second section 50, and third section 70 continues towards the closed position, upper lip 80 of third section 70 will engage lower lip 102 of fourth section 90, causing it to move downward. When upper lip 100 of fourth section 90 engages housing lip 104, its movement will be stopped. First section 30 will continue to move towards the closed position until lower edge 34 contacts base 12.

FIG. 10 illustrates a plan view of container 10. Shaft 144 is shown as extending outward from base 12, as will be explained later. FIG. 11 illustrates a sectional view taken at line 11-11 in FIG. 4 and further illustrates the relationship of the gears and motor. Motor 136 is a reversible motor that may be driven by household current or by batteries. Drive shaft 138 connects to drive gear 140, which engages reduction gear 142 mounted on shaft 144. Shaft 144 is supported by the wall of base 12 and extends through opening 150 in base 12. Reduction gear 146 engages secondary drive gear 146, which is mounted on shaft 148. Shaft 148 is supported between outer wall 20 of receptacle 16 and base 12. Inner wall 18 of receptacle 16 forms an area where a food bowl 22 or other container may be placed.

Another key feature of container 10 is illustrated by FIGS. 11 and 12. If the owner of the animals wants to manually open or close container 10, for cleaning or to check or replace the contents within it, shaft 144 may be depressed against spring 152 to cause reduction gear 142 to become disengaged from the other gears. This allows movable portion 26 to be moved manually to a desired position. The owner may then add food or water or even place a new bowl in receptacle 16. When this operation is completed, the pressure on shaft 144 is removed and spring 152 causes reduction gear 142 to return to its engaged position. Spring 152 is supported between reduction gear 142 and outer wall 20 of receptacle 16.

FIG. 13 illustrates a block diagram of the control components of the preferred embodiment of the present invention. Transmitter 114, which is worn by an animal 110, transmits a signal 116 that is detected by receiver 118. Receiver 118 transmits data to controller 120, which, in the preferred embodiment of the invention, is in the form of an integrated circuit card having central processing unit 122 and memory 124. Based on the signal received, controller 120 signals for the motor 136 to move the movable portion 26 of container 10 to an open or a closed position. The owner of the animals may pre-select which animal or animals may be allowed access to the contents of container 10 and which animals may not have access to container 10. Thus, if receiver 118 receives one or more signals from those animals allowed to have access to container 10, container 10 will open and remain open until either there are no signals being detected from animals allowed access to container 10 or it detects a signal from an animal not allowed to have access to container 10. Controller 120 may also signal motor 136 not to move movable portion 26. Power source 132, which can be either household current or batteries, provides power to motor 132. Controller 120 includes its own power in the form of dry cell battery 154.

Controller 120 may also be equipped with a timer 126, which can delay the operation of the motor for a set period of time from one to three seconds. Thus, if receiver 118 detects an acceptable pre-selected signal 116 and transmits data causing controller 120 to activate motor 136, the activation command from controller 120 may be delayed for the set length of time so if the animal 110 whose signal is detected is just passing by container 10, timer 126 will delay the action of motor 136 for the set time. If after the set time receiver 118 is no longer detecting an acceptable pre-selected signal, the signal from controller 120 to activate motor 136 will be canceled and container 10 will remain closed. If, on the other hand, container 10 is open in response to the continued presence of at least one animal selected by the owner to have access to the contents of container 10 and the acceptable signal or signals is/are no longer detected by receiver 10, as in the instance where the animal or animals may briefly turn away, timer 126 will delay movement of movable portion 26 to begin closing container 10 for the duration of the selected time delay. If after the time delay has passed at least one acceptable signal is detected by receiver 118 and no unacceptable signals are being detected by receiver 118, the closing command will be canceled and container 10 will remain open.

FIG. 14 illustrates a logic diagram of the control function of a system of the preferred embodiment of the invention. Position switches 128 and 130 are mounted on container 10 to indicate that the container is closed or open. Inputs provided to controller 120 include the presence or absence of an acceptable signal, the presence of an unacceptable signal, and the position of the movable portion 26 of container 12.

In another aspect of the invention, the owner of multiple animals may use two or more containers 10 with access to them each specifically controlled by identifying signal 116 transmitted by each animal's transmitter 114. Thus, what may be an unacceptable signal at one container may be an acceptable signal at another container and the owner can control the providing of different nutritional requirements to different animals or simply choose to provide access due to the characteristics of the animals.

The foregoing description of an exemplary embodiment of the present invention has been presented for purposes of enablement, illustration, and description. It is not intended to be exhaustive of or to limit the present invention to the precise form discussed. There are, however, other configurations for systems and methods for selectively providing access to animal food not specifically described herein, but with which the present invention is applicable. The present invention should therefore not be seen as limited to the particular embodiment described herein; rather, it should be understood that the present invention has wide applicability with respect to animal feeding systems and methods. Such other configurations can be achieved by those skilled in the art in view of the description herein. Accordingly, the scope of the invention is defined by the following claims.

What is claimed is:

1. An animal food container for selectively controlling access to the food in the container in response to pre-selected signals comprising:
   a base;
   a housing mounted on said base forming an enclosure in combination with the base;
   a receptacle for holding animal food mounted inside said container;
   a movable portion mounted on said housing movable between an open and a closed position, said movable portion providing access to the animal food in the open position;
   a sealing strip mounted on said movable portion to provide a seal when said movable portion is in the closed position;
   drive means mounted within said housing for moving said movable portion between the open and closed positions;
   a receiver mounted on said enclosure for receiving said pre-selected signals and transmitting data in response to said signals;
   a controller mounted in said enclosure responsive to said data from the receiver and controlling said drive means to open and close said movable portion, wherein the detection of at least one pre-selected acceptable signal by said receiver causes said driving means to move the movable portion to the open position, wherein said controller delays activation of said drive means for a time period of between one to three seconds upon detection of said pre-selected acceptable signal by said receiver, and wherein said movable portion will remain closed if said receiver is no longer detecting the signal after the passage of said time period.

2. An animal food container for selectively controlling access to the food in the container in response to pre-selected signals comprising:
   a base;
   a housing mounted on said base forming an enclosure in combination with the base;
   a receptacle for holding animal food mounted inside said container;
   a movable portion mounted on said housing movable between an open and a closed position, said movable portion providing access to the animal food in the open position;
   a sealing strip mounted on said movable portion to provide a seal when said movable portion is in the closed position;
   drive means mounted within said housing for moving said movable portion between the open and closed positions;
   a receiver mounted on said enclosure for receiving said pre-selected signals and transmitting data in response to said signals, wherein the absence of a pre-selected acceptable signal by said receiver causes said drive means to move the movable portion to the closed position from the open position or maintain the movable portion in the closed position; and
   a controller mounted in said enclosure responsive to said data from the receiver and controlling said drive means to open and close said movable portion, wherein said movable portion will remain closed if said receiver is no longer detecting the signal after the passage of said time period and, wherein said controller delays activation of said drive means for a time period of between one to three seconds upon loss of said pre-selected acceptable signal by said receiver when said container is in the open position.

\* \* \* \* \*